Patented Mar. 28, 1933

1,902,871

UNITED STATES PATENT OFFICE

GEORGE R. LOCKHART, OF PROVIDENCE, RHODE ISLAND, ASSIGNOR TO MANVILLE JENCKES COMPANY, OF PAWTUCKET, RHODE ISLAND, A CORPORATION OF RHODE ISLAND

REENFORCED VULCANIZED RUBBER ARTICLES AND PROCESS OF MAKING THE SAME

No Drawing.   Application filed May 18, 1929.  Serial No. 364,322.

Attempts have heretofore been made to utilize rayon (artificial silk) in the manufacture of cord tires but heretofore such attempts have resulted in the production of an inferior product having neither the strength, life, nor other desirable qualities of a tire of usual construction in which the strengthening threads are composed of cotton. Heretofore when attempts have been made to produce an article of vulcanized rubber such as a cord tire having imbedded therein strengthening threads of rayon, it has been found that the vulcanizing operation has an injurious effect on the rayon, weakening it and destroying its elasticity and other desirable qualities so that when the tire or article is subjected to repeated flexures, the threads give way. The strength and elasticity of the threads are reduced to such an extent that the resulting product is markedly inferior to the commercial article in which the strengthening threads are composed of cotton.

With this state of the art in mind, the principal object of the present invention is to produce an article of vulcanized rubber such as a cord tire in which the reinforcing or strengthening threads are composed of rayon, which threads in the completed vulcanized article have substantially the same strength, elasticity and other desirable qualities which they had before being incorporated into the article.

Another object of the present invention is to produce an improved rayon thread which can be used satisfactorily and which produces improved results, in the manufacture of reenforced, vulcanized articles such as cord tires.

With the above objects in view, a feature of the present invention contemplates the use in the manufacture of a cord tire or other reenforced vulcanized rubber article, of reenforcing or strengthening threads of viscose rayon in the condition in which it is after being washed to remove the injurious chemicals and prior to the usual finishing processes to prepare the thread for its ordinary uses such as desulphurizing, bleaching, etc. By using the thread as it exists at this stage in its manufacture it has been found that the thread is not injuriously affected to any substantial extent by the vulcanizing process and that a much stronger and more lasting product is produced than when thread in its usual finished state is used. It is believed that the improved results secured are due either to the peculiar physical condition of the thread or to the presence in or on the thread of sulphur and sulphur compounds which produce a better and more intimate union between the rubber and the threads. Whatever the reason, the resulting product is one in which the rayon threads have the strength, elasticity and other qualities desirable in a reenforced, vulcanized rubber article and have a better and more intimate union with the rubber, and the article is superior in every respect to one in which rayon thread in its finished state is used.

Advantageous results can be secured by the use of the viscose rayon thread in its raw or undesulphurized condition as stated above. It has been found, however, that superior results can be secured by treating the undesulphurized thread with formaldehyde. This treatment with formaldehyde with or without the addition of other compounds to assist the action has been found to change the physical properties of the rayon, the most important result in connection with the present invention being a gain in its capacity for resisting the heat used during the vulcanizing operation. During the vulcanizing operation a temperature somewhat above 200 degrees Fahrenheit is ordinarily used and this heat has a tendency to weaken the rayon thread. The treatment with formaldehyde has been found to change the physical properties of the rayon to such an extent that the threads are not weakened or at best only very slightly weakened by the heat of the vulcanizing operation.

In connection with the treatment of the rayon with formaldehyde it has been found that this treatment, even when applied to rayon thread which has been finished by the usual processes of desulphurizing, bleaching, etc. produces a thread which can be used with advantageous results in the manufacture of reinforced vulcanized rubber articles and it has also been found that the rayon thread so treated may be produced by any of the well-known processes of producing rayon or artificial silk, such as those for producing cuprammonium rayon, nitro-cellulose rayon, or celanese acetate (rayon). Accordingly, in its broader aspects the feature of the present invention involving the use, in the manufacture of reenforced, vulcanized rubber articles, of rayon threads which have been subjected to a formaldehyde treatment is not limited to the use of viscose rayon which has not been desulphided, or to rayon produced by the viscose process.

In the manufacture of rayon by the well-known viscose process, the fibre is precipitated in an acid bath. In treating this fibre with formaldehyde in accordance with a feature of the present invention, the fibre is first washed free from acid and is then treated with formaldehyde with or without the addition of compounds to assist the action in solution. After washing, the fibre may be allowed to dry before the formaldehyde treatment, but preferably the fibre is subjected to the formaldehyde treatment while still wet and before any drying has taken place. This is for the reason that it has been found that the rayon can be treated with the formaldehyde more easily and less expensively if it is not allowed to dry after being washed, and before being subjected to the formaldehyde treatment.

The reenforced vulcanized rubber articles produced by the present invention present much greater resistance, both cold and hot, to wear, use, abrasion, elastic efforts, etc. than articles of this character containing strengthening threads of rayon which have heretofore been produced. In practicing the present invention the best results are obtained when the rayon threads are produced by the viscose process, and this process is carried out in such a manner as to produce a rayon thread having a low elastic limit and a high tensile strength.

In carrying out the features of the present invention involving the treatment of the rayon thread with formaldehyde it is to be understood that other aldehydes may be used and that the term "formaldehyde" is to be construed as including other aldehydes or aldehyde derivatives which will have substantially the same reactive affect on the rayon thread.

The invention having been thus described and its nature and scope indicated what is claimed is:—

1. An article of manufacture consisting of vulcanized rubber having imbedded therein strengthening threads of undesulphurized viscose rayon.

2. An article of manufacture consisting of vulcanized rubber having imbedded therein strengthening threads of viscose rayon treated with formaldehyde while in an undesulphurized condition.

3. The process of manufacturing viscose rayon thread which comprises washing the thread to remove the injurious acids and subjecting the thread to the action of formaldehyde while in the undesulphurized condition.

4. The process of manufacturing viscose rayon thread which comprises washing the thread to remove the injurious acids, and while the thread is still wet and in the undesulphurized condition subjecting it to the action of formaldehyde.

5. The process which comprises imbedding a viscose rayon thread while in the undesulphurized condition in rubber and subjecting the rubber and thread to a vulcanizing operation to form a reinforced vulcanized rubber article.

6. The process which comprises treating an undesulphurized viscose rayon thread with formaldehyde, imbedding the thread in rubber, and subjecting the rubber and thread to a vulcanizing operation to form a reinforced vulcanized rubber article.

In testimony whereof I have signed my name to this specification.

GEORGE R. LOCKHART.